US010429257B2

(12) United States Patent
Yu et al.

(10) Patent No.: US 10,429,257 B2
(45) Date of Patent: *Oct. 1, 2019

(54) HIGH-DAMPING RUBBER ISOLATION BEARING, INTELLIGENT BEARING AND BEARING MONITORING SYSTEM

(71) Applicants: Shenzhen Municipal Design & Research Institute Co., Ltd., Shenzhen (CN); Shenzhen Innova-Wise Engineering Technology Consulting Co., Ltd., Shenzhen (CN)

(72) Inventors: Fang Yu, Shenzhen (CN); Ruijuan Jiang, Shenzhen (CN); Yiyan Chen, Shenzhen (CN); Weiming Gai, Shenzhen (CN); Jie Peng, Shenzhen (CN); Jucan Dong, Shenzhen (CN)

(73) Assignees: Shenzhen Municipal Design & Research Institute Co., Ltd. (CN); Shenzhen Innova-Wise Engineering Technology Consulting Co., Ltd. (CN)

( * ) Notice: Subject to any disclaimer, the term of this patent is extended or adjusted under 35 U.S.C. 154(b) by 29 days.

This patent is subject to a terminal disclaimer.

(21) Appl. No.: 15/865,196

(22) Filed: Jan. 8, 2018

(65) Prior Publication Data

US 2018/0202878 A1 Jul. 19, 2018

Related U.S. Application Data

(63) Continuation of application No. PCT/CN2016/097564, filed on Aug. 31, 2016.

(30) Foreign Application Priority Data

Jul. 18, 2016 (CN) .......................... 2016 1 0571259

(51) Int. Cl.
*G01L 5/00* (2006.01)
*G01L 19/06* (2006.01)
(Continued)

(52) U.S. Cl.
CPC ............ *G01L 5/0019* (2013.01); *B32B 15/06* (2013.01); *B32B 15/18* (2013.01); *E01D 19/041* (2013.01);
(Continued)

(58) Field of Classification Search
None
See application file for complete search history.

(56) References Cited

U.S. PATENT DOCUMENTS 4,779,842 A * 10/1988 Brauer .................. E01D 19/048
254/93 R
2004/0221520 A1* 11/2004 Chiang .................. E04H 9/023
52/167.1
(Continued)

FOREIGN PATENT DOCUMENTS

CN 201605529 U 10/2010
CN 201738236 U * 2/2011
(Continued)

*Primary Examiner* — Andre J Allen
(74) *Attorney, Agent, or Firm* — Winstead PC

(57) ABSTRACT

A high-damping rubber isolation bearing, an intelligent bearing and a bearing monitoring system are disclosed. The high-damping rubber isolation bearing comprises a top bearing plate, a bottom bearing plate, a high-damping rubber bearing body and a base plate, wherein at least one pressure sensing unit is arranged between the top bearing plate and the base plate, or between the bottom bearing plate and the base plate. The intelligent bearing includes a data acquisition unit, a data output unit and the high-damping rubber isolation bearing. The data acquisition unit transmits the bearing pressure measured by the at least one pressure sensing unit to the data output unit. The bearing monitoring system (Continued)

includes a data acquisition unit, a data output unit, a monitoring center and the high-damping rubber isolation bearing.

8 Claims, 5 Drawing Sheets

(51) Int. Cl.
    *E01D 19/04*         (2006.01)
    *B32B 15/18*         (2006.01)
    *B32B 15/06*         (2006.01)
    *E04H 9/02*         (2006.01)
    *E01D 101/30*       (2006.01)
    *E01D 101/00*       (2006.01)

(52) U.S. Cl.
    CPC .............. *E04H 9/022* (2013.01); *G01L 19/06* (2013.01); *G01L 19/0609* (2013.01); *E01D 2101/00* (2013.01); *E01D 2101/30* (2013.01)

(56) References Cited

U.S. PATENT DOCUMENTS

| | | | | |
|---|---|---|---|---|
| 2018/0066406 A1* | 3/2018 | Dong | .................... | E01D 19/042 |
| 2018/0128696 A1* | 5/2018 | Jiang | .................... | G01L 1/2287 |
| 2018/0142434 A1* | 5/2018 | Yu | .......................... | E01D 19/042 |
| 2018/0142734 A1* | 5/2018 | Gai | ........................ | F16C 41/007 |

FOREIGN PATENT DOCUMENTS

| | | | |
|---|---|---|---|
| CN | 203654160 U | | 6/2014 |
| CN | 104343081 A | * | 2/2015 |
| CN | 204421957 U | | 6/2015 |
| CN | 105625168 A | * | 6/2016 |

\* cited by examiner

HIGH-DAMPING RUBBER ISOLATION BEARING, INTELLIGENT BEARING AND BEARING MONITORING SYSTEM

This application is a Continuation of PCT Application No. PCT/CN2016/097564, filed Aug. 31, 2016, which is hereby incorporated by reference.

FIELD OF THE INVENTION

The present disclosure relates to the technical field of bearings, in particular to a high-damping rubber isolation bearing, an intelligent bearing and a bearing monitoring system.

BACKGROUND OF THE INVENTION

Currently, isolation bearings are widely used in the field of bridges. Among which, high-damping rubber bearings have been widely used in the actual bridge engineering in many countries around the world since they cause no lead pollution, have remarkable isolation effects and are a mature technology. In a bridge structure, the stability and reliability of the bearing which serves as a main force transfer component directly affects the safety performance of the entire bridge. Bearing failure will lead to the overall collapse of the entire bridge, resulting in immeasurable serious consequences, and therefore the long-term safety of the bearing is particularly important. For isolation bearings using rubber materials, the rubber materials age over time and fatigue of metal components occur as time passes. For different operating environments, the durability of the isolation bearings and whether bearing failure occurs due to the influence of various factors such as aging of the rubber materials, metal fatigue, etc., are all related to the overall safety of the bridge. From the long-term health situation of the bridge, it is particularly important to monitor the health status of an isolation bearing.

In the prior art, the monitoring of the force condition for the isolation bearing mainly relies on a pressure sensing unit, and data information of pressure obtained from the sensing unit needs to be exported by a lead wire. Thus, there is a need to make micro-holes on the bearing to lead out the lead wire, causing the mechanical properties of the bearing to be affected. As the bridge bearing needs to bear a huge load, tiny pores will cause huge safety risks. In addition, the replacement of the sensor unit is also a problem faced by the current bearing technology. Since the sensing unit is usually fixedly connected to the bearing body or embedded in the bearing, if the sensor unit is to be replaced, the entire bearing needs to be replaced as well, leading to a high cost and complicated operation.

SUMMARY OF THE INVENTION

The technical problem to be solved by the present disclosure is to provide a high-damping rubber isolation bearing which is capable of monitoring the force condition of the bearing in real time, does not affect mechanical properties of the bearing, and facilitates replacement of the pressure sensing unit.

The further technical problem to be solved by the present disclosure is to provide an intelligent bearing and a bearing monitoring system which can monitor and reflect the health status of the bearing in real time.

The technical scheme that the present disclosure adopts to solve the above technical problems is as follows: the present disclosure provides a high-damping rubber isolation bearing, comprising a top bearing plate, a bottom bearing plate and a high-damping rubber bearing body fixedly arranged between the top bearing plate and bottom bearing plate. The high-damping rubber isolation bearing further comprises a base plate stacked together with the top bearing plate or bottom bearing plate, wherein at least one pressure sensing unit is arranged between the top bearing plate and the base plate, or between the bottom bearing plate and the base plate.

As a further improvement of the above technical solution, the pressure sensing unit is a nano rubber sensor.

As a further improvement of the above technical solution, the base plate and the nano rubber sensor are arranged between the top bearing plate and the high-damping rubber bearing body or between the bottom bearing plate and the high-damping rubber bearing body.

As a further improvement of the above technical solution, the nano rubber sensor comprises at least two fabric layers, wherein nano-conductive rubber is filled between adjacent fabric layers, and the nano-conductive rubber is a rubber substrate doped with carbon nanotubes.

As a further improvement of the above technical solution, a limit unit is arranged on a lateral side of the base plate which is subjected to a lateral force.

As a further improvement of the above technical solution, the limit unit is a strip-shaped steel bar or limit block, and is fixedly connected to the top bearing plate or the bottom bearing plate by bolts and abuts against the lateral side of the base plate.

As a further improvement of the above technical solution, the high-damping rubber bearing body comprises several layers of rubber sheets, steel plates arranged between the rubber sheets, and closing plates connected with rubber sheets at an upper and a lower end face of the high-damping rubber bearing body, wherein the rubber sheets and the steel plates, as well as the rubber sheets and the closing plates are bonded together through vulcanization.

The present disclosure provides an intelligent bearing, comprising a data acquisition unit, a data output unit, and the high-damping rubber isolation bearing as described above, wherein the data acquisition unit transmits bearing pressure data measured by the pressure sensing unit to the data output unit.

The present disclosure further provides a bearing monitoring system, comprising a data acquisition unit, a data output unit, a monitoring center and the high-damping rubber isolation bearing as described above. The data acquisition unit transmits bearing pressure data measured by the pressure sensing unit to the data output unit, and the data output unit transmits the pressure data to the monitoring center.

As a further improvement of the above technical solution, the monitoring center comprises a data receiving unit, a server, a monitoring unit, an analysis unit, and a human-computer interaction unit. The data receiving unit transmits the pressure data from the data output unit to the server, the monitoring unit, the analysis unit and the human-computer interaction unit.

The embodiments of the present disclosure has the beneficial effects that:

1. The pressure sensing unit is arranged between the top bearing plate and the base plate, or between the bottom bearing plate and the base plate. Therefore, the pressure sensing unit is easy to replace, and a real-time monitoring of the force state for the bearing can be realized.

2. The lead wire of the pressure sensing unit is led out from between the top bearing plate and the base plate, or from between the bottom bearing plate and the base plate, thus there is no need to make micro-holes for the lead wire on the bearing, ensuring that the mechanical properties of the bearing are not affected.

3. The bearing monitoring system of the present disclosure can instantaneously transmit the pressure data measured by the pressure sensing unit to the monitoring center which then monitors and analyzes the pressure data so as to monitor and reflect the health status of the bearing in real time.

BRIEF DESCRIPTION OF THE DRAWINGS

FIG. 1A-1B are cross-sectional views of an overall structure of a high-damping rubber isolation bearing in a first embodiment of the present disclosure, wherein FIG. 1A shows one sensor, and FIG. 1B shows a plurality of sensors;

DETAILED DESCRIPTION OF THE EMBODIMENTS

In order that the objects, features and effects of the present embodiments may be fully understood, a full and clear description of concepts, specific structures and technical effects produced of the present embodiments will be made in below combined with embodiments and accompanying drawings. Obviously, the embodiments described are merely a part, but not all embodiments of the present disclosure. Based on the embodiments of the present disclosure, other embodiments obtained by the skilled in the art without inventive effort should all belong to the protection scope. In addition, all the coupling/connecting relationships mentioned herein do not merely refer to direct connection or coupling of members, but rather a better coupling structures formed by adding or subtracting coupling accessories according to specific implementation. Technical features of the embodiments may be combined as long as they are not mutually contradictory.

Figure 1A:
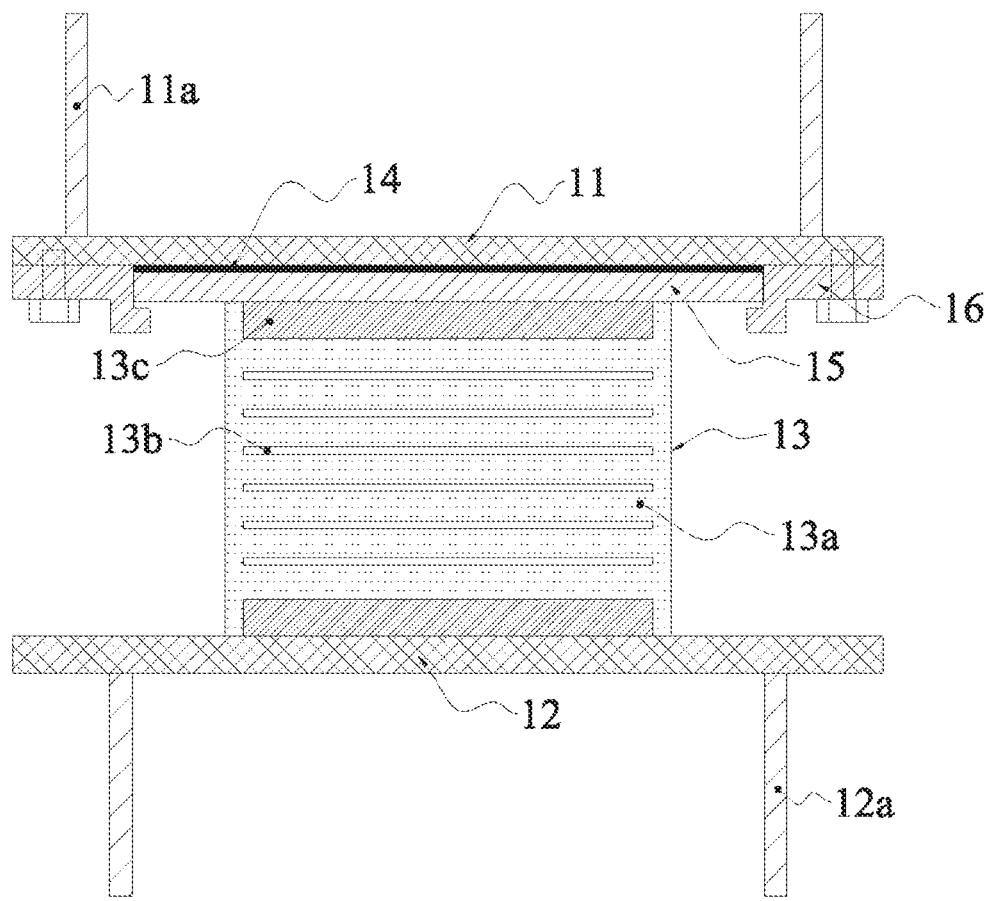

FIG. 1A shows a specific structure of a high-damping rubber isolation bearing in the first embodiment. As shown in FIG. 1A, the high-damping rubber isolation bearing of the embodiment comprises a top bearing plate 11, a bottom bearing plate 12, a high-damping rubber bearing body 13, a nano rubber sensor 14, a base plate 15 and a limit unit 16. A top anchor bolt 11a is fixedly provided on the upper surface of the top bearing plate 11, and a bottom anchor bolt 12a is fixedly provided on the lower surface of the bottom bearing plate 12, the top anchor bolt 11a and the bottom anchor bolt 12a being used for fixed connection with constructions such as bridges, etc.

The high-damping rubber isolation bearing adopts the nano rubber sensor 14 to monitor the force condition of the bearing in real time, and then obtains a vertical pressure of the bearing. As the nano rubber sensor 14 is thin in thickness and simple in structure, it does not affect various mechanical properties of the bearing. As the rubber has good fatigue resistance and high temperature resistance, the nano rubber sensor 14 has a high durability and the number of alternating stress cycles is greater than 50 million.

In preferred embodiments, the nano rubber sensor 14 is used as a pressure measuring unit. Of course, other pressure sensors can also be used, such as but not limited to a strain gauge pressure sensor, a ceramic pressure sensor, a diffused silicon pressure sensor, a piezoelectric pressure sensor, etc.

The nano rubber sensor 14 and the base plate 15 are sequentially arranged in a top-down order between the top bearing plate 11 and the high-damping rubber bearing body 13. The limit unit 16 is arranged on a lateral side of the base plate 15 which is subjected to a lateral force, so as to ensure the stability of the base plate 15 under the lateral force. In different embodiments, the base plate 15 can also be arranged above the top bearing plate 11, as long as the base plate 15 and the top bearing plate 11 are stacked between which the nano rubber sensor 14 is arranged.

The limit unit 16, which is preferably a strip-shaped steel bar or a limit block, is fixedly connected to the top bearing plate 11 by bolts and abuts against the lateral side of the base plate 15. Of course, the shape, the fixed position and fixed manner of the limit unit 16 are not limited to the above-described embodiments, as long as the limiting function is achieved. The limit unit 16 and the top bearing plate 11 are connected by bolts to facilitate the replacement of the nano rubber sensor 14. In case of replacement, the limit unit 16 is taken off first, and then the top bearing plate 11 together with the construction above is jacked using a jacking device, thus the nano rubber sensor 14 can be replaced.

The high-damping rubber bearing body 13 comprises several layers of rubber sheets 13a, steel plates 13b arranged between the rubber sheets 13a, and closing plates 13c connected with the rubber sheets 13a at an upper and a lower end face of the high-damping rubber bearing body 13. The rubber sheets 13a and the steel plates 13b, as well as the rubber sheets 13a and the closing plates 13c are bonded together through vulcanization. The upper closing plate 13c is fixedly connected with the base plate 15 by bolts, and the lower closing plate 13c is fixedly connected with a bottom supporting plate 12 by bolts.

Figure 1B:
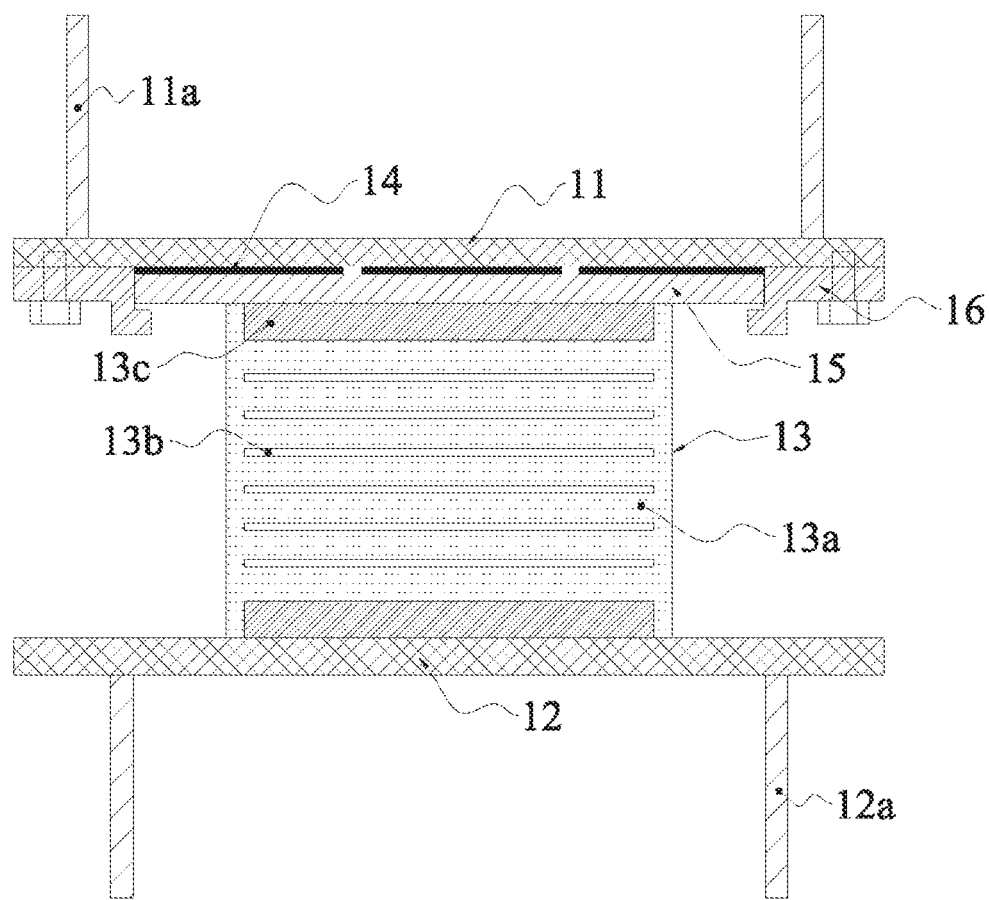

In order to accurately monitor the force condition of the entire bearing and to consider the availability of monitoring under a partial loading situation, preferably, an array of nano rubber sensors 14 is arranged between the top bearing plate 11 and the base plate 15, as shown in FIG. 1B. High-temperature-resistance shielding lead wires 17 connecting two electrodes of the nano rubber sensor 14 are led out from a gap between the base plate 15 and the top bearing plate 11, thus there is no need to make micro-holes for the lead wires on the bearing, effectively ensuring the mechanical properties of the bearing.

Figure 2:
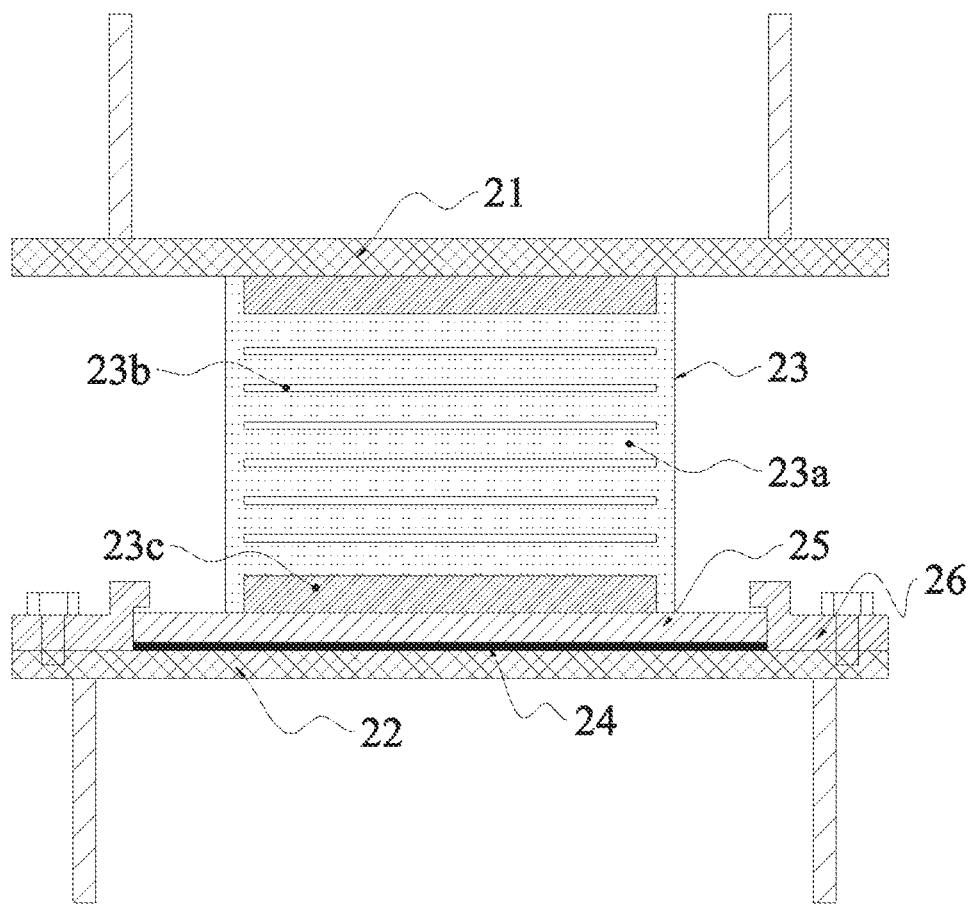
FIG. 2 is a cross-sectional view of the overall structure of the high-damping rubber isolation bearing in the second embodiment of the present disclosure.

FIG. 2 shows a second embodiment of a specific structure of the high-damping rubber isolation bearing. As shown in FIG. 2, the high-damping rubber isolation bearing of this embodiment comprises a top bearing plate 21, a bottom bearing plate 22, a high-damping rubber bearing body 23, a nano rubber sensor 24, a base plate 25 and a limit unit 26. The difference between this embodiment and the first embodiment lies in that the nano rubber sensor 24 and the base plate 25 are arranged between the bottom bearing plate 22 and the high-damping rubber bearing body 23. Similarly, in different embodiments, the base plate 25 can also be arranged below the bottom bearing plate 21, as long as the base plate 25 and the bottom bearing plate 21 are stacked between which the nano rubber sensor 24 is arranged.

The high-damping rubber bearing body 23 comprises several layers of rubber sheets 23a, steel plates 23b arranged between the rubber sheets 23a, and closing plates 23c connected with the rubber sheets 23a at an upper and a lower end face of the high-damping rubber bearing body 23. The rubber sheets 23a and the steel plates 23b, as well as the rubber sheets 23a and the closing plates 23c are bonded together through vulcanization, and the base plate 25 is fixedly connected with the lower closing plate 23c by bolts.

The limit unit 26 is fixedly connected with the bottom bearing plate 22 by bolts and is arranged at a lateral side of the base plate 25 which is subjected to a lateral force.

In this embodiment, upon replacing the nano rubber sensor 24, the top bearing plate 21, the construction above the top bearing plate 21, the high-damping rubber bearing body 23 and the base plate 25 are simultaneously jacked up so as to allow replacement of the nano rubber sensor 24.

Figure 3:
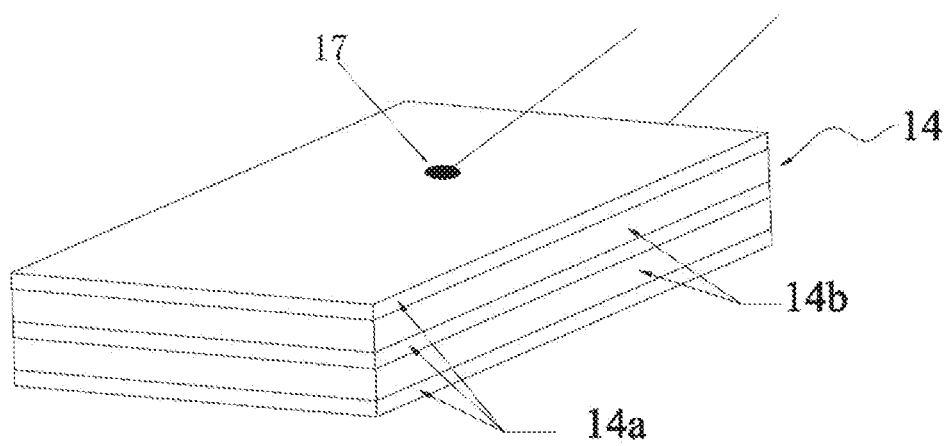
FIG. 3 is a structural schematic diagram of a nano rubber sensor of the high-damping rubber isolation bearing of the present disclosure.

FIG. 3 shows a schematic diagram of the overall structure of the nano rubber sensor 14 of the high-damping rubber isolation bearing of the embodiments.

The operating principle of the nano rubber sensor is as follows: the nano rubber sensor is deformed under the action of an external load, so that distances between conductive particles in the conductive rubber are changed, and thus a conductive network formed by the conductive particles is changed, represented by changes in the resistivity and resistance of the conductive rubber, which consequently cause changes in the measurement of electrical signals. Then, according to the piezoresistive characteristics of the conductive rubber, the force condition of a pressure bearing surface can be derived.

Preferably, the nano rubber sensor 14 is of a multilayer structure, wherein as skeleton layers, a plurality of high strength fabric layers 14a are distributed at intervals from top to bottom, and nano-conductive rubber 14b of a certain thickness is filled between the fabric layers 14a. The fabric layers 14a are dense in texture, and have a certain thickness, elasticity and strength, satisfying the requirement of elastic deformation under a high pressure without being damaged. Preferably, the fabric layers 14a are made of elastic fibers such as medium or high class spandex, high-elastic nylon, etc. At the same time, there are gaps in the texture formed by the vertical and horizontal fibers of the fabric layers 14a, which ensure that a nano-conductive rubber solution covered on the fabric layers 14a can infiltrate into the gaps during preparation, thereby enhancing the integrity of the structure. The rubber substrate material of the nano-conductive rubber 14a is polydimethylsiloxane rubber (PDMS) consisting of basic constituents and a curing agent in a mixing ratio of 10:1; the conductive fillers are carbon nanotubes, preferably multi-walled carbon nanotubes (MW-CNT). The mass percentage of the multi-walled carbon nanotubes is between 8% and 9%.

The high strength fabric layers 14a are added to the nano rubber sensor 14 as a stiff skeleton, which significantly improves the strength and toughness of the nano rubber sensor 14 under a high pressure of 0 to 50 MPa, avoiding tearing and ensuring the stability and repeatability of such sensing unit under high pressure.

The preparation of nano rubber sensor is carried out mainly by solution blending and molding. The specific preparation method comprises the following steps:

S1, ingredient mixing: weighing the basic constituents of polydimethylsiloxane rubber (PDMS), the curing agent and carbon nanotubes in accordance with a mass ratio, pouring the mixture into a mixer, and grinding and mixing the same mechanically at room temperature to ensure that the carbon nanotubes are uniformly distributed in the rubber substrate to make the nano-conductive rubber solution.

S2, synthesis: preparing a plurality of high-strength fabrics of the same size, laying a fabric layer on a bottom plate of a mold, uniformly coating the nano-conductive rubber solution prepared in S1 onto the fabric at a certain thickness, and then laying another fabric layer over it. Depending on the thickness required for a nano-conductive rubber sensing element, the process of coating the nano-conductive rubber solution and additionally laying the fabric layer can be repeated.

S3, curing: placing a top plate of the mold on the uppermost fabric layer of the uncured nano rubber sensor; through the connection between the top and bottom bearing plates of the mold, applying a certain pressure to the nano-conductive rubber material to ensure uniformity and compactness of the thickness thereof; and placing the mold in a container at 60° C., vacuuming the container and leaving it for at least 300 min.

After the nano rubber sensor is cured, the cured sheet type nano rubber sensor can be cut into desired sizes and shapes by machining tools according to design requirements of the sensor. After connecting the electrodes and an insulating protective layer, a sheet-type flexible nano-conductive rubber pressure sensor having a large measuring range is fabricated.

Figure 4:
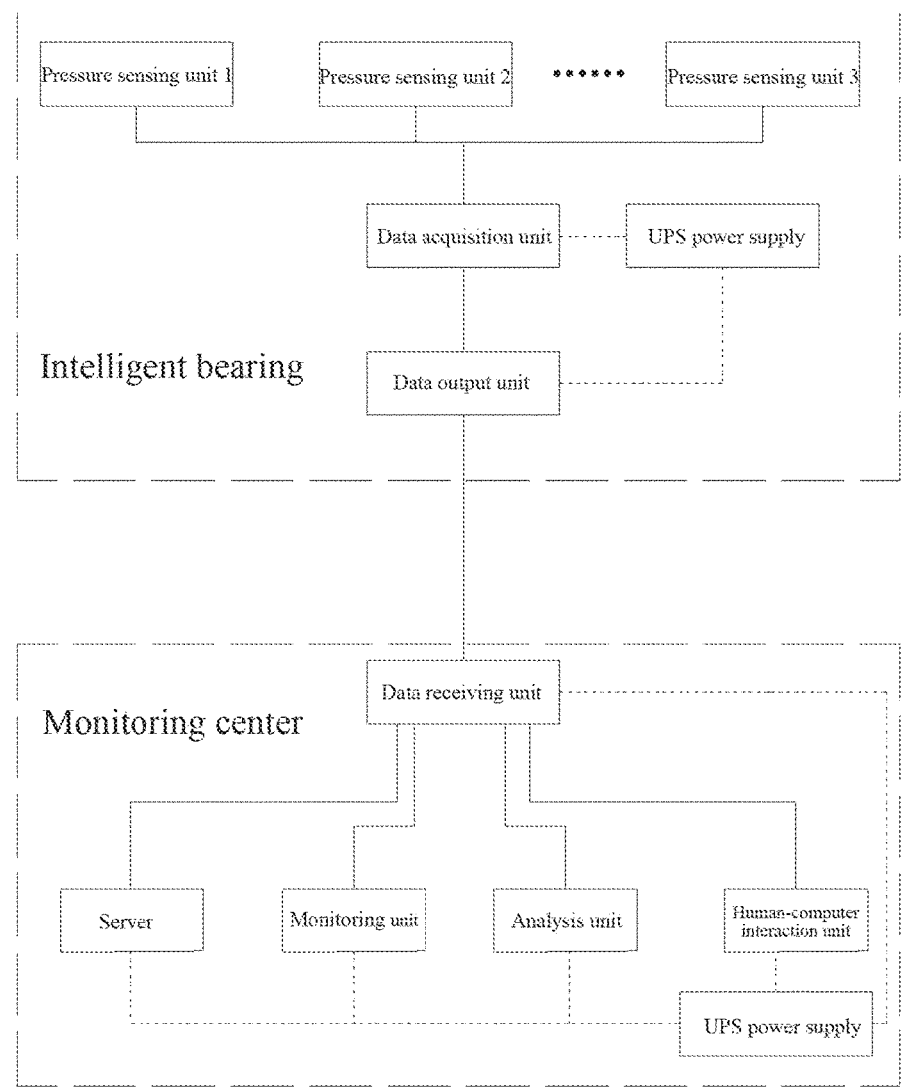
FIG. 4 is a schematic diagram showing the connection of modules of a bearing monitoring system of the present disclosure.

FIG. 4 is a schematic diagram showing the connection of modules of a bearing monitoring system of the embodiments. The bearing monitoring system includes an intelligent bearing and a monitoring center.

The intelligent bearing comprises the high-damping rubber isolation bearing as described above, a data acquisition unit, a data output unit, and a UPS power supply. The data acquisition unit acquires pressure data of each of the nano rubber sensors in the high-damping rubber isolation bearing. The data output unit is preferably an optical wireless switch, which transmits the pressure data to the monitoring center. The UPS provides uninterrupted power to every electricity-consuming module in the intelligent bearing.

The monitoring center comprises a data receiving unit, a server, a monitoring unit, an analysis unit, a human-computer interaction unit and a UPS power supply. The data receiving unit is also preferably an optical wireless switch, which is used to receive the pressure data transmitted by the data output unit. The data receiving unit transmits the received data to the server, the monitoring unit, the analysis unit and the human-computer interaction unit, the server manages and controls the data, the monitoring unit performs instant monitoring on the data, and the analysis unit evaluates and analyzes the data. The UPS power supply provides uninterrupted power to every electricity-consuming module in the monitoring center.

Through the acquisition, transmission, monitoring and analysis performed on the monitoring data of the bearing, the bearing monitoring system can instantly understand and judge the health status of the bearing to ensure the safe use of the bearing.

Preferred embodiments of the present disclosure have been described above, but the present invention is not limited thereto. Numerous variations, substitutions and equivalents may be made by those skilled in the art without departing from the scope of the disclosure and should all fall within the scope defined by the claims of the present disclosure.

The invention claimed is:

1. A high-damping rubber isolation bearing, comprising:
a top bearing plate,
a bottom bearing plate, a high-damping rubber bearing body fixedly arranged between the top bearing plate and the bottom bearing plate, a base plate stacked together with the top bearing plate, and at least one pressure sensing unit arranged between the stacked top bearing plate and base plate;

wherein, the at least one pressure sensing unit and the base plate are sequentially arranged between the top bearing plate and the high damping rubber bearing body, the at least one pressure sensing unit is arranged in a gap between the top bearing plate and the base plate, the length of the pressure sensing unit is the same as that of a side of the base plate attached by the pressure sensing unit, wherein, the pressure sensing unit is a nano-rubber sensor, a limit unit is arranged on a lateral side of the base plate which is subjected to a lateral force, the limit unit is used to limit lateral movement of the base plate and the sensing unit, a combination of the base plate, the sensing unit and the limit unit is used to lead out lead wire and facilitate replacement of the sensing unit.

2. The high-damping rubber isolation bearing according to claim 1, wherein the nano-rubber sensor comprises at least two fabric layers, wherein nano-conductive rubber is filled between adjacent fabric layers, and the nano-conductive rubber is a rubber substrate into which carbon nanotubes are doped.

3. The high-damping rubber isolation bearing according to claim 1, wherein the limit unit is a strip-shaped steel bar or limit block, and is fixedly connected to the top bearing plate or the bottom bearing plate by bolts and abuts against the lateral side of the base plate.

4. The high-damping rubber isolation bearing according to claim 1, wherein the high damping rubber bearing body comprises:

several layers of rubber sheets, steel plates arranged between the rubber sheets, and closing plates connected with rubber sheets at an upper and a lower end face of the high-damping rubber bearing body, wherein the rubber sheets and the steel plates, as well as the rubber sheets and the closing plates are bonded together through vulcanization.

5. An intelligent bearing, comprising:

the high-damping rubber isolation bearing according to claim 1, a data acquisition unit transmitting bearing pressure data measured by the pressure sensing unit to a data output unit, and a data output unit.

6. A bearing monitoring system, comprising:

the high-damping rubber isolation bearing according to claim 1, a data acquisition unit transmitting bearing pressure data measured by the pressure sensing unit to a data output unit, a data output unit transmitting the pressure data to a monitoring center, and a monitoring center.

7. The bearing monitoring system according to claim 6, wherein the monitoring center comprising:

a server, a monitoring unit, an analysis unit, a human-computer interaction unit, and a data receiving unit transmitting the pressure data from the data output unit to the server, the monitoring unit, the analysis unit and the human-computer interaction unit.

8. A high-damping rubber isolation bearing, comprising:

a top bearing plate, a bottom bearing plate, a high-damping rubber bearing body fixedly arranged between the top bearing plate and the bottom bearing plate, a base plate stacked together with the bottom bearing plate, and at least one pressure sensing unit arranged between the stacked bottom bearing plate and base plate;

wherein, the at least one pressure sensing unit and the base plate are sequentially arranged between the bottom bearing plate and the high damping rubber bearing body, the at least one pressure sensing unit is arranged in a gap between the bottom bearing plate and the base plate, the length of the pressure sensing unit is the same as that of a side of the base plate attached by the pressure sensing unit, wherein, the pressure sensing unit is a nano-rubber sensor, a limit unit is arranged on a lateral side of the base plate which is subjected to a lateral force, the limit unit is used to limit lateral movement of the base plate and the sensing unit, a combination of the base plate, the sensing unit and the limit unit is used to lead out lead wire and facilitate replacement of the sensing unit.

\* \* \* \* \*